Figure 8:
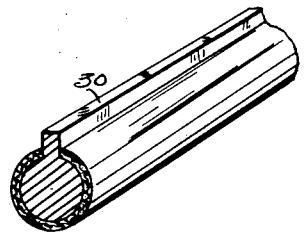

April 10, 1934. T. P. CHAMPION ET AL 1,954,773
METHOD OF WELDING
Filed March 8, 1932 3 Sheets-Sheet 1
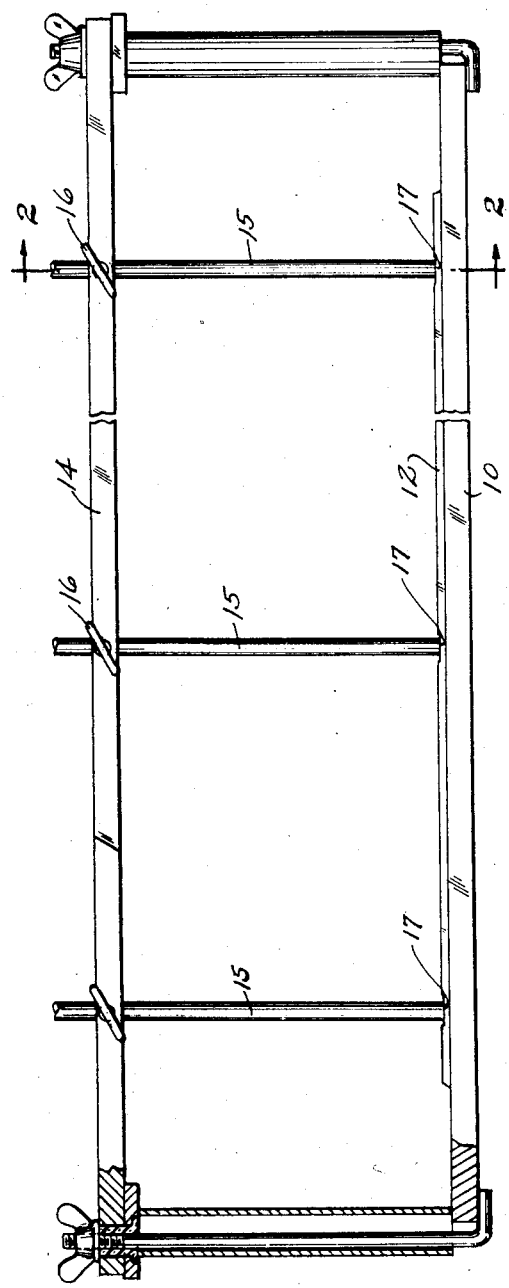
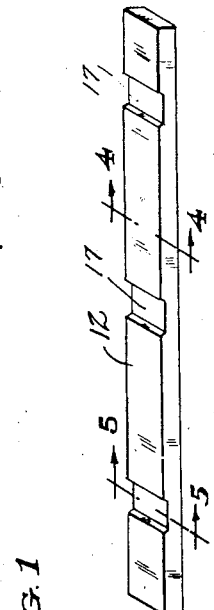
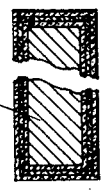
Inventors
Thomas P. Champion,
Robert C. Kinkead
and
Robert R. Applegate
By Bates, Golrick & Teare
Attorneys

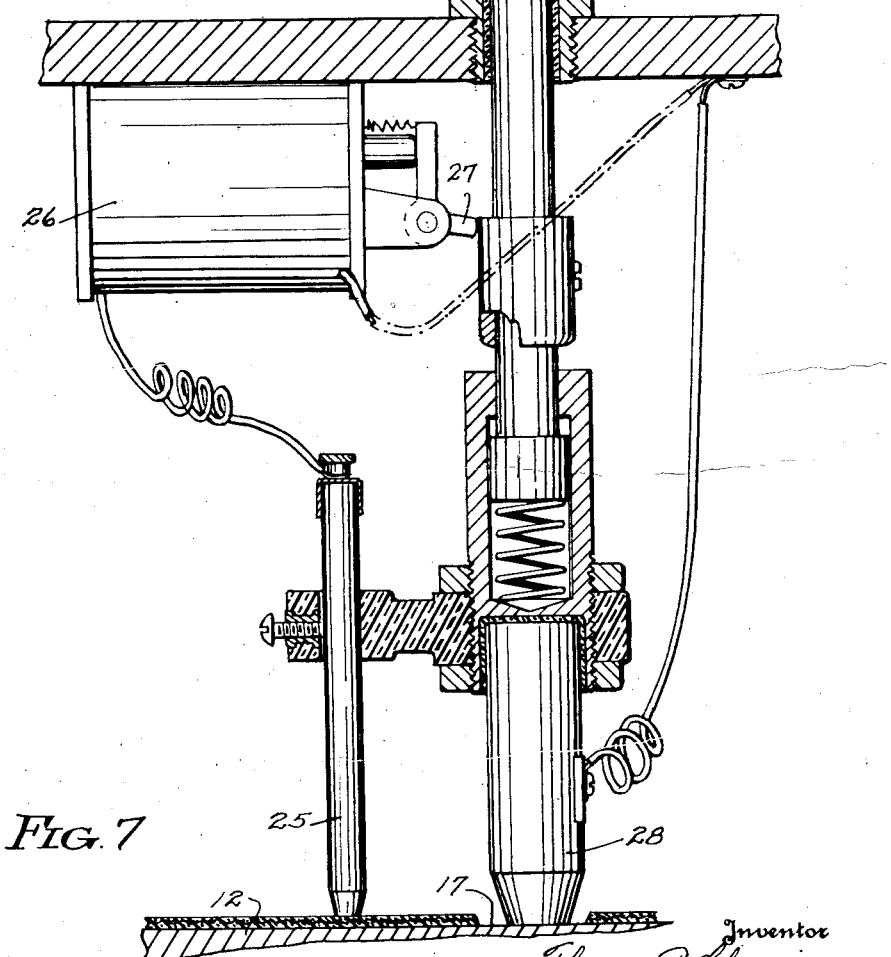

April 10, 1934.    T. P. CHAMPION ET AL    1,954,773
METHOD OF WELDING
Filed March 8, 1932    3 Sheets-Sheet 3

Inventor
Thomas P. Champion,
Robert E. Kinkead
and
Robert R. Applegate
By Bates, Golrick & Teare
Attorneys Patented Apr. 10, 1934

1,954,773

UNITED STATES PATENT OFFICE 1,954,773

METHOD OF WELDING

Thomas P. Champion, Robert E. Kinkead, and Robert R. Applegate, Shaker Heights, Ohio; said Kinkead and said Applegate assignors to said Champion Application March 8, 1932, Serial No. 597,536

10 Claims. (Cl. 219—10)

This invention relates to a method and apparatus for arc welding, and particularly for effecting the automatic welding of relatively long articles. Ever since the advent of arc welding, efforts have been made to effect the automatic welding of relatively long articles, such as pipes, boilers, tanks and the like, but many problems have arisen which could not economically be successfully overcome. Where bare wire is used, the metal which forms the weld is not sufficiently ductile to obtain satisfactory results. Accordingly, a flux covered rod was developed, which provided the desired ductility in the weld, but due to the use of combustible material in the covering, the heat developed during the welding operation would raise the temperature of the rod beyond the burning point of the covering and burn it prematurely. Accordingly, covered rods for manual operation have been limited to lengths of fourteen to eighteen inches. For machine operation, the lengths have been used from thirty-six to forty-eight inches, but beyond this point, the burning of the combustible material and the inability to obtain an incombustible material that would produce ductility limited the development of arc welding in the automatic field to relatively short pieces. An effort was made to weld articles such as pipes by arranging a series of short rods at spaced intervals, and simultaneously welding the areas covered by the respective rods, but this arrangement necessitated an overlapping of the welded portions and thereby made an undesirable weld.

Some efforts have been made to feed bare or lime coated welding wire from a reel and obtain ductility by the use of a gas-shielded process, but this has not been used to any considerable extent commercially for the arc is difficult to start and maintain in the gas envelope due to the tendency of the envelope to unshield the arc as a result of convection currents. Furthermore, the degree of sensitivity of the feeding mechanism apparently cannot be increased to the point at which the difficulty can be overcome. When the shield is in use, the rate of feed is about doubled because of the higher arc voltage and greater heat, so it is apparent that a rapidly changing feeding rate is required to compensate for the condition in which the gas shield is off or on. A second difficulty arises from the high degree of solubility of the hot gases in the molten metal of the arc crater and the consequent formation of gas pockets in the weld. It would obviously be impractical to overcome this difficulty by using a simple flux because of the tendency of the covered rod to burn when used in long lengths as has been heretofore described.

The same difficulties have been encountered with the atomic hydrogen process. Apparently the latest attempt at a solution of the problem of obtaining ductile metal in the weld with machine feed has been the use of a rod that has a special contacting mechanism attached to the machine head. This procedure has failed, however, due to the face that the rod cannot be made sufficiently uniform to permit successful operation. This apparently unanticipated difficulty has been serious, and so far as we are aware, no practical solution has been developed up to the present time.

A further consideration in connection with the development of arc welding processes is the fact that expensive machinery has been employed and the work has been brought to the machine, but due to the difficulties inherent in the matter of obtaining ductility, no one so far as we know, has been able to provide a process or apparatus, which will produce a ductile uniform weld in unlimited length.

It is an object of our invention to provide an apparatus and method by means of which the electrode is self-consumed during the welding process and by means of which a ductile uniform weld may be obtained in unlimited length in a simple and expeditious manner, and without the need for expensive automatic machinery.

To attain this object, we utilize the idea of a self-consuming electrode, which embodies a principle introduced into this country in 1915 with a slag covered welding rod. The operation was performed by laying the rod upon the part to be welded and then making the connection at one end and starting the arc at the other end. In the case of a slag covered welding rod, it is difficult to apply enough heat beyond an eighteen inch rod to float the slag out of the weld so that the quality of the weld has always been uncertain. In the case of paste covered welding rods, the amount of heat cannot be very large for otherwise the covering is burned or melted and the arc becomes unstable after the first few inches of the coating have been destroyed. Furthermore, slag from the covering is carried into the weld metal, and is not floated to the surface. Since the advent of X-ray examination of welds, the slag must be floated out of the metal or the weld will not pass inspection.

We have discovered that the difficulty in operating the paste covered welding rod, as a self-consuming electrode, arises from the fact that the electrical connection is made at one end while the arc is started at the other end of the rod, and that by the time the arc has progressed twelve to fourteen inches, the covering is destroyed and the process rendered inoperative. We have also discovered that this objection can be overcome by making contact with a paste-covered rod either continuously or at spaced intervals along the welding rod. Under this arrangement the electrode carries current only a relatively short distance so that large electrodes and heavy currents can be employed without the limitations inherent in prior schemes for using self-consuming electrodes.

The apparatus for carrying out our invention may therefore embody a bus bar of unlimited length which is suitably insulated from the work and which is arranged to make contact at spaced intervals with the self-consuming electrode that is laid upon the work along the line of weld. Thereafter, the arc may be drawn at one end of the rod whereupon each succeeding contactor progressively conducts the current to the rod as the arc progresses down the line of weld.

Figure 9:
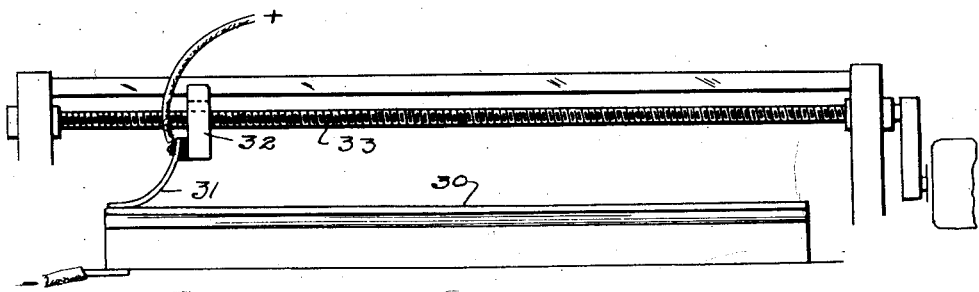
Figure 10:
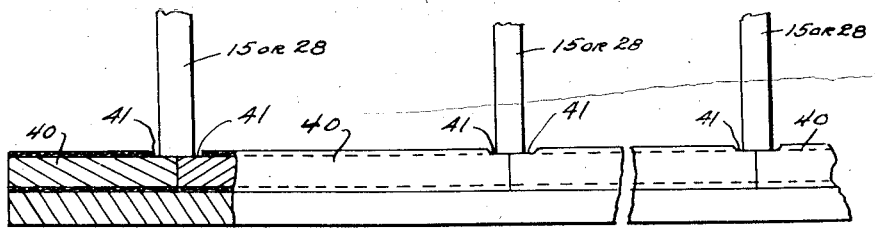

Referring now to the drawings, we have shown one form of apparatus by means of which our invention may be accomplished. In this arrangement, Fig. 1 is an elevation, partially in section showing one form of the apparatus in place on the work; Fig. 2 is a transverse section and is indicated by the line 2—2 of Fig. 1; Fig. 3 is a perspective of one form of welding rod; Figs. 4 and 5 are sections indicated by the lines 4—4 and 5—5 respectively of Fig. 3; Fig. 6 is a fragmentary plan of a modified form of apparatus; Fig. 7 is a section indicated by the lines 7—7 on Fig. 6; Fig. 8 is a perspective of a modified form of welding rod; Fig. 9 is an elevation of an apparatus arranged to be used with the rod shown in Fig. 8; Fig. 10 is a diagrammatic view illustrating the use of a series of comparatively short welding rods in connection with the apparatus shown in Fig. 1.

The apparatus illustrated in Figs. 1 and 2 utilizes the method of making contact at spaced intervals, and in such illustration, the parts to be welded are indicated at 10 and 11, as being disposed in abutting engagement, while the paste-covered rod 12 is laid on the parts and over the joint 13 therebetween. A suitable bus bar 14 is supported above the line of weld, while contactors 15 extend downwardly from the bus-bar and engage the welding rod at spaced intervals. To this end, the rod is bared in the region of the contactors, as is shown, for example, at 17 in Figs. 1, 3 and 5. Suitable set-screws 16 may be utilized for locking the contactors after they have been properly positioned upon the welding rod. With the arrangement shown, a positive lead 18 to the welding machine may be connected to the bus bar, while the negative lead 19 may be connected to the work. Thereupon, the arc may be started at one end of the rod by means, for example, of a carbon pencil in the manner well known in this art. Thereupon, the arc progresses down the line of weld and automatically consumes the electrode, and produces a ductile weld.

We have found that if the contactors are kept sufficiently close together, the covering will not burn, and that the process is therefore well adapted for automatic welding in unlimited lengths. Furthermore, we have found that the simplicity of the apparatus makes the process available for efficient use since the work is not brought to a machine which requires a factory mounting and limited movement in a longitudinal direction.

A modification of the contactor is illustrated in Figs. 6 and 7, wherein a pilot member in the form of a carbon pencil 25 may be caused to short circuit part of the current and energize a magnet 26, which, in turn, will actuate a latch 27 that normally holds a contactor 28 in engagement with the rod. Upon release of the latch, a spring 29 will automatically raise the contactor out of the path of the arc, and allow the arc to pass therebeneath without damage to the contactor. This may also be used to automatically terminate the weld at a predetermined point.

A further modification of our invention is shown in Figs. 8 and 9 in which a continuous contact may be maintained on the welding rod in the region of the weld. This may be accomplished by utilizing an uncoated fin 30, which extends longitudinally of the rod and which is adapted to be engaged by a conductor 31. This conductor may be stationary or may be carried by a nut 32 on a worm 33 and moved along the rod in advance of the arc, and at a rate that is substantially equal to the burning rate so that the current carrying part of the rod is sufficiently short to avoid burning of the covering.

When it is desirable to weld excessive lengths by this method, it may be found convenient to use a series of comparatively short welding rods, such as are indicated at 40 in Fig. 10. In such instances, the contactors 15 or 28 will be arranged to contact with the end areas of adjacent rods 40, from which the coating was previously removed as at 41. The conductor will thereby form a path for the current between adjacent rods and prevent an arc from forming between the abutting surfaces of the rod and prematurely destroying the coating of the rods. An advantage of this method is that the weld may be started at both ends and simultaneously progressed toward the middle to expedite the operation.

To make this method effective, we have found that the size of rod and character of covering should be proportioned to the current impressed. This will result in an electrode that is entirely consumed at the completion of the welding operation. We have found, for example, that an electrode is entirely consumed, if it comprises a steel strip of approximately one inch width and one-sixteenth of an inch thickness with a covering of .050 inch on the top, bottom and sides thereof with a current of 225-amperes at 28-volts and with contactors engaging the electrodes at intervals of substantially eight inches. Ingredients of the covering which we have used may be in the following percentages by weight:—

| | Per cent |
|---|---|
| Silica | 28 |
| Iron oxide | 14 |
| Ferro-manganese | 18 |
| Kaolin | 12 |
| Calcium fluoride | 10 |
| Sodium fluoride | 4 |
| Chalk | 6 |
| Manganese dioxide | 8 |
| | 100 |

These ingredients are all mixed together in a finely powdered state and water is added until the mixture attains the consistency of a thin paste. The rod is then dipped in the paste and then is covered with a cotton sleeve. Thereafter, it is again dipped so that the sleeve is covered with the paste. When the combined thickness approximates .050", the rod is dried. Thereafter it is bared at spaced intervals for the type shown in Fig. 1, for engagement with the contactors.

From the foregoing description it will be apparent that our invention obtains a material reduction in the cost of labor since one operator operates more than one arc and since the process has a high operative factor with a low waste factor. A further important consideration is the fact that the weld possesses constant quality, for the rate at which the welding heat is applied remains substantially constant, the arc length remains substantially uniform and defects due to frequent starting and stopping of the arc are eliminated. In addition, the long application of heat at the start of the arc eliminates gas pockets, whereas in previous methods the cold plate and hot plating wire would entrap some of the gas. Other additional advantageous features of our invention are low initial investment, low maintenance cost and the reduction of the skill required to make successful welds.

We claim:

1. A method of arc welding comprising laying a coated electrode upon a line of weld and applying current at spaced intervals and keeping the points of application in sufficient proximity to each other that the temperature in the electrode remains below the point where the coating is rendering inoperative for welding purposes.

2. A method of arc welding, comprising laying a self-consuming electrode along a line of weld, applying current to the electrode in close proximity to the weld and progressively moving the point of application of the current along the electrode and ahead of the arc, but maintaining it in sufficient proximity to the arc that the usefulness of the coating for welding purposes is maintained.

3. A method of arc welding comprising bringing the two parts to be welded in close proximity to each other, placing a plurality of welding rods along the joint between the parts, starting the arc on one of the rods and progressively applying current ahead of the arc.

4. A method of arc welding, comprising laying a coated electrode upon the work and along the line of weld, and applying current to the electrode at spaced intervals and so spacing the current application points along the electrode that the heat developed in the electrode during the welding operation is not sufficient to impair the usefulness of the coating for welding purposes.

5. A method of arc welding, comprising laying an electrode having a layer of combustible and insulating material thereon upon the work and applying one lead of an electric circuit to the electrode and the other lead to the work, short circuiting the electrode and work to start the arc and then shifting the current carrying medium along the electrode as the arc progresses but maintaining the contact in sufficient proximity to the arc that the usefulness of the combustible material for welding purposes is not impaired.

6. A method of arc welding, comprising laying an electrode having a combustible and insulating material thereon along a line of weld, connecting the work to one lead of an electric circuit and then connecting the electrode to the other lead at a plurality of points, short circuiting the arc to start the operation and then passing current simultaneously through all of the contacts and maintaining the contacts along the unconsumed part of the rod in circuit with the electrode whereby as the arc passes each contact, current is conducted automatically to the electrode through the remaining contacts.

7. A method of arc welding, comprising laying a coated electrode upon the work and along the line of weld, making contact with the electrode and moving the contact along the electrode ahead of the arc.

8. A method of arc welding, comprising laying an electrode having a layer of combustible and insulating material thereon upon the work, making contact with the electrode, and moving the contact along the electrode at a rate substantially in synchronism with the burning rate of the covering.

9. A method of arc welding comprising laying a plurality of welding bars having a nonconducting coating thereon in end-to-end relationship, applying current across the joint of the electrodes by a common contactor, and short circuiting the electrode to start the arc.

10. A method of arc welding, comprising laying a plurality of electrodes having combustible and insulating coatings thereon along a line of weld, connecting the work to one lead of an electric circuit and then connecting each two adjacent electrodes simultaneously to the other lead with the same contacting surfaces, short circuiting the arc to start the operation and then passing current simultaneously through all of the contacts with the electrodes the remaining contacts.

THOMAS P. CHAMPION.
ROBERT E. KINKEAD.
ROBERT R. APPLEGATE.